(12) United States Patent
Kretzler et al.

(10) Patent No.: US 8,782,611 B1
(45) Date of Patent: Jul. 15, 2014

(54) VISUAL INSPECTION AND DEBUGGING OF THREADS IN PARALLEL COMPUTING SYSTEMS

(75) Inventors: Brian Kretzler, Cedar Park, TX (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1074 days.

(21) Appl. No.: 12/546,527

(22) Filed: Aug. 24, 2009

(51) Int. Cl.
*G06F 9/44* (2006.01)

(52) U.S. Cl.
USPC .......................................................... 717/129

(58) Field of Classification Search
None
See application file for complete search history.

(56) References Cited

U.S. PATENT DOCUMENTS

| | | | |
|---|---|---|---|
| 6,480,818 B1 * | 11/2002 | Alverson et al. | 703/26 |
| 6,681,384 B1 * | 1/2004 | Bates et al. | 717/129 |

* cited by examiner

*Primary Examiner* — Henry Tsai
*Assistant Examiner* — Juanito Borromeo
(74) *Attorney, Agent, or Firm* — Patterson & Sheridan, LLP

(57) ABSTRACT

One embodiment of the invention sets forth a mechanism for debugging PPU code executing on a PPU where many thread groups simultaneously execute the same instruction on different slices of input data. A debugger engine receives breakpoint information associated with a breakpoint set on a specific instruction within PPU code. The debugger engine then injects a debugging routine into compiled PPU code. A driver notifies the debugger engine when the specific instruction within the PPU code is executed. The debugger engine then retrieves thread state information associated with each thread group in a set of thread groups being inspected from the PPU via the PPU driver. Among other things, thread state information includes the execution state of each thread in each thread group and values of variables included in the PPU code. The thread state information is then transmitted to the debugger user interface for display to a software developer.

20 Claims, 7 Drawing Sheets

US 8,782,611 B1

VISUAL INSPECTION AND DEBUGGING OF THREADS IN PARALLEL COMPUTING SYSTEMS

BACKGROUND OF THE INVENTION

1. Field of the Invention

The present invention relates generally to the field of software debugging and, more specifically, to visual inspection and debugging of threads in parallel computing systems.

2. Description of the Related Art

Software debugging tools allow software developers to inspect the flow of execution of a set of instructions executed by a processor. For example, a software developer may analyze the state of a variable included in the set of instructions by inspecting the value of the variable at different points during the execution of the set of instructions. Traditional software debugging tools are designed for sequential execution, where each instruction is executed once after a previous instruction and the software developer steps through each instruction to examine the state of the thread executing the instruction.

Traditional software debugging tools are effective when the set of instructions is executed on a limited number of threads, such as in a central processing unit (CPU). However, parallel processing units, such as graphics processing unit (GPUs), usually include a large number of threads that execute the same instruction in a set of instructions on different slices of data in a parallel execution environment. When using traditional software debugging tools to debug instructions executed on a parallel processing unit, the software developer cannot gain much information regarding the execution of the instructions by examining the state of a single thread. Therefore, traditional software debugging tools are ineffective when the set of instructions is executed on parallel processing unit.

As the foregoing illustrates, what is needed in the art is an effective mechanism for debugging instructions executing on a parallel processing unit, such as a GPU.

SUMMARY OF THE INVENTION

One embodiment of the present invention sets forth a method for debugging a software program executing on a parallel processor on different input data. The method includes the steps of receiving breakpoint information from a development environment, wherein the breakpoint information is associated with a breakpoint set on a first instruction within the software program, injecting a debugging routine into the software program based on the breakpoint information, wherein the debugging routine causes the parallel processor to interrupt the execution of the software program when the first instruction is executed, and receiving a notification from a driver indicating that the first instruction has been executed by the parallel processor and that the execution of the software program has been interrupted. The method further includes the steps of retrieving thread state information associated with a first thread group in a set of thread groups executing within the parallel processor, wherein each thread in the first thread group executes the one or more instructions in the software program on different input data, and transmitting the thread state information associated with the first thread group to a user interface for display on a display device.

One advantage of the disclosed method is that by analyzing thread state information associated with different thread groups executing the parallel processor code, the software developer gains better understanding of the execution pattern of the parallel processor code within the parallel processor. Such an understanding allows the software developer to write more efficient parallel processor code.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
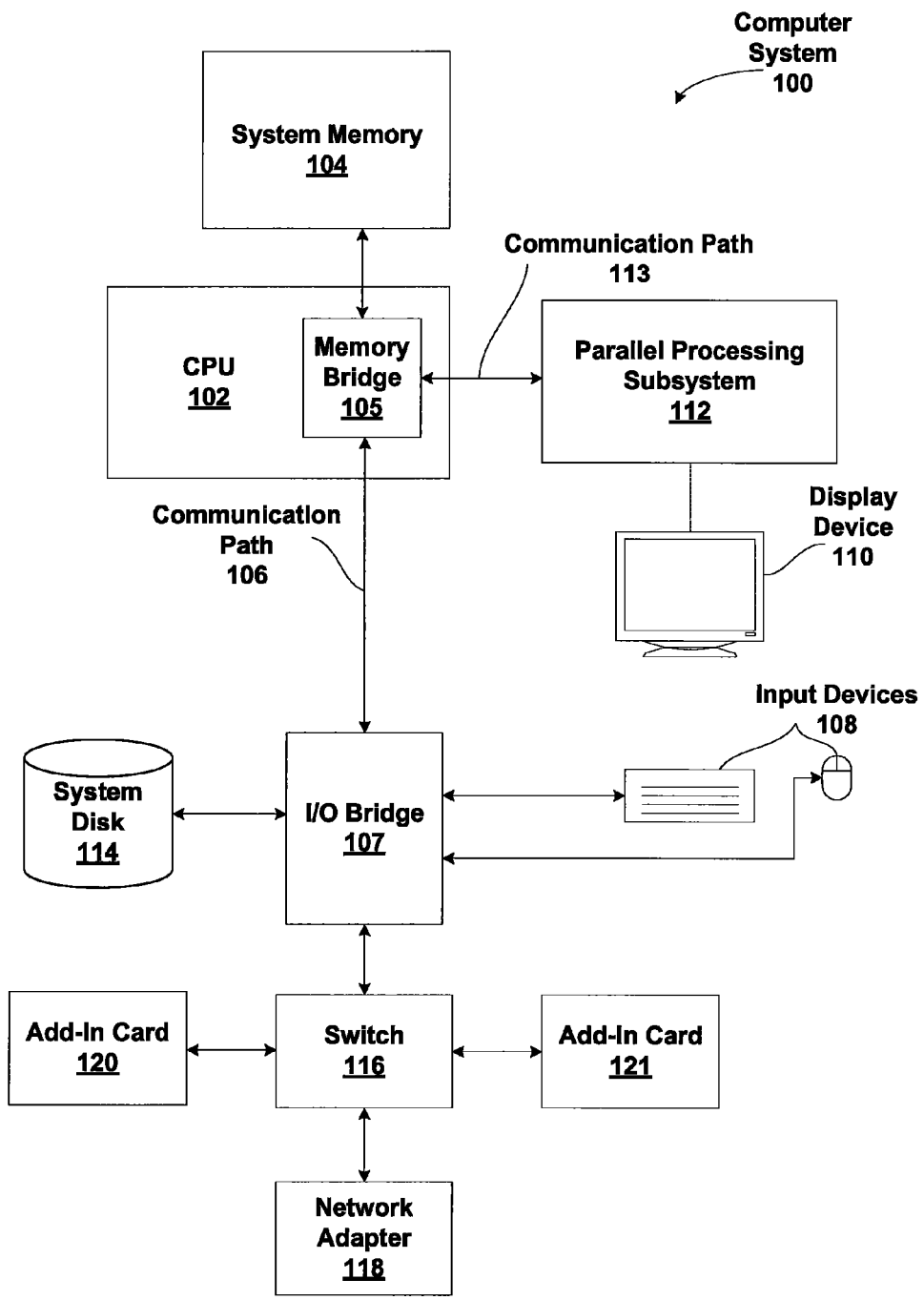
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
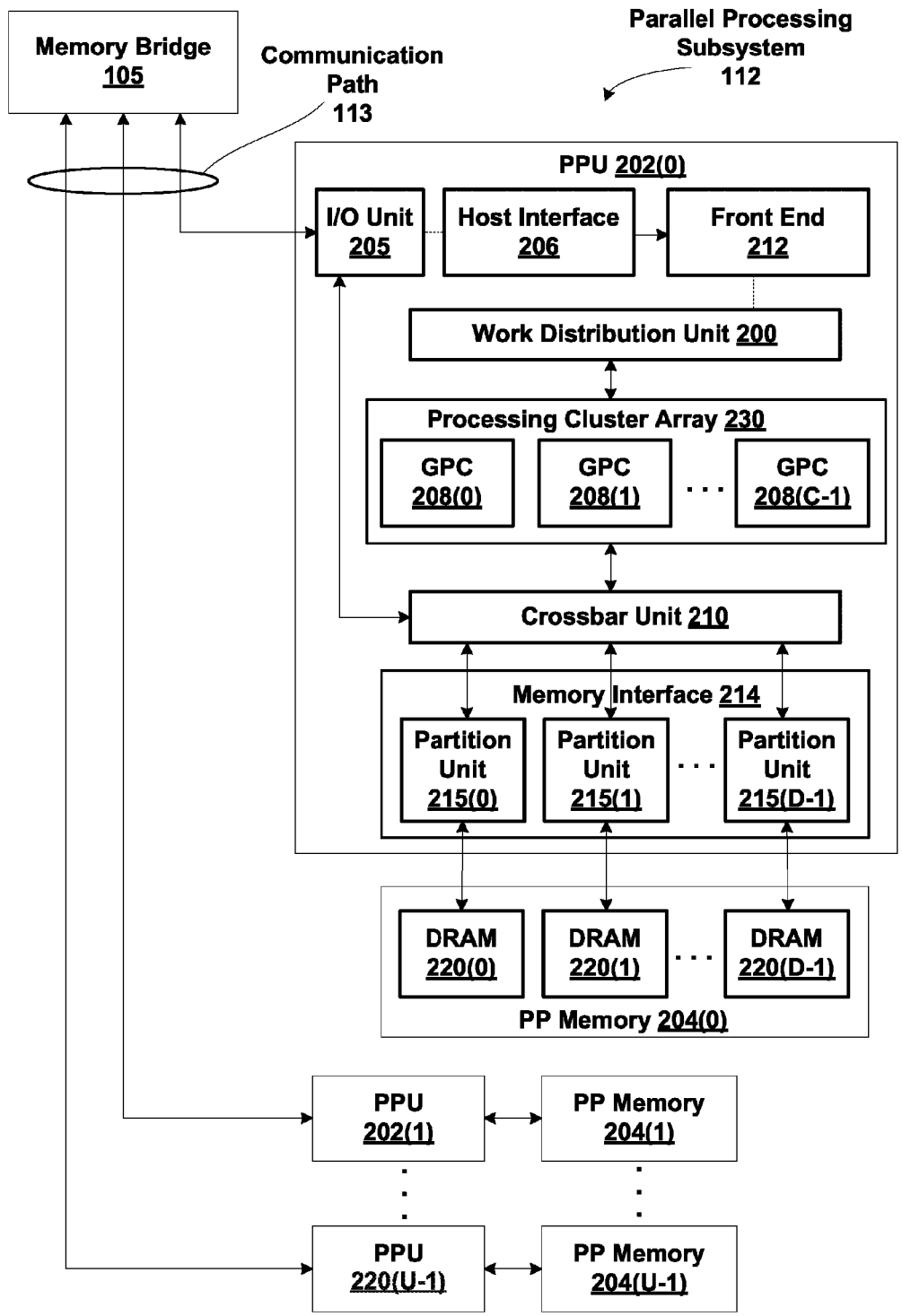
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks are related to a wide variety of applications, including but not limited to, computationally intensive tasks such as linear and nonlinear data transforms, filtering of video and/or audio data, modeling operations (e.g., applying laws of physics to determine position, velocity and other attributes of objects), and graphics processing tasks such as image rendering operations (e.g., tessellation shader, vertex shader, geometry shader, and/or pixel shader programs), and so on. Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

A work distribution unit 200 may be configured to output tasks at a frequency capable of providing tasks to multiple GPCs 208 for processing. When PPU 202 is used for graphics processing, for example, the processing workload for each patch is divided into approximately equal sized tasks to enable distribution of the tessellation processing to multiple GPCs 208. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g. DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3:
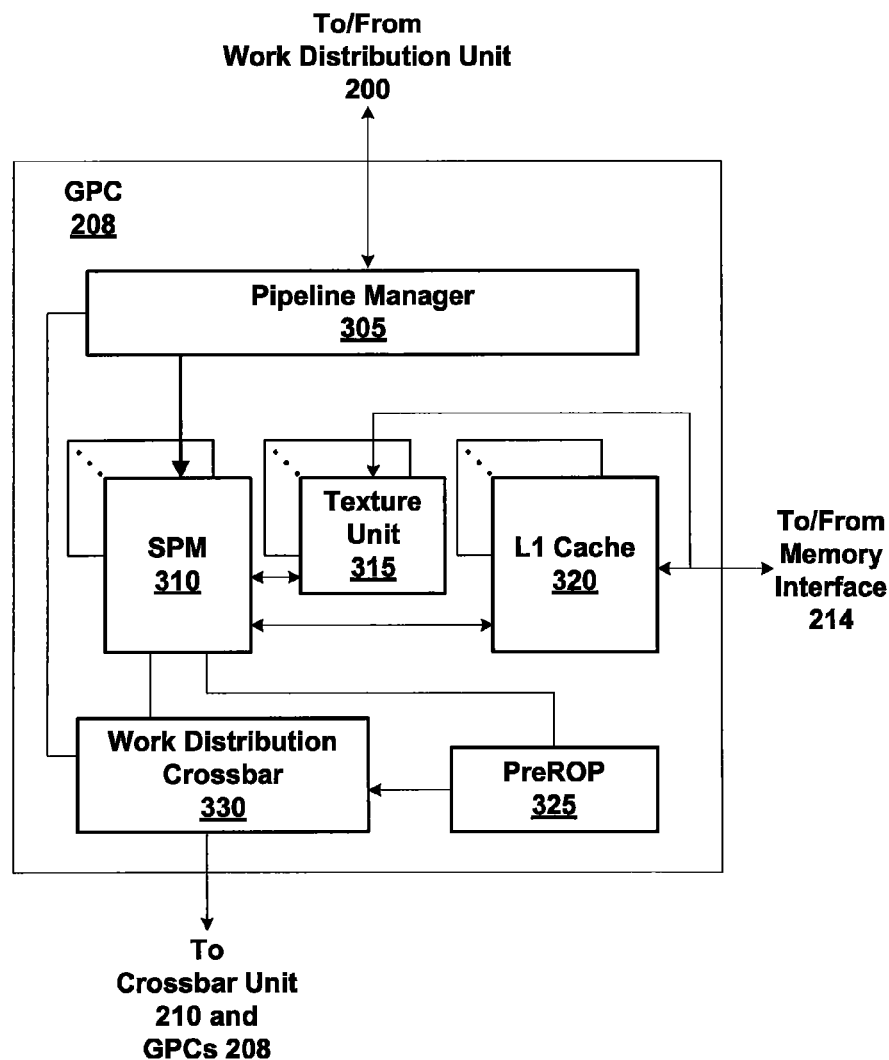
FIG. 3 is a block diagram of a GPC within one of the PPUs of FIG. 2, according to one embodiment of the present invention.

FIG. 3 is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime. A collection of threads, operating in a SIMD or SIMT fashion, working on the same task and capable of sharing values between threads is referred to herein as a "cooperative thread array" ("CTA").

In graphics applications, a GPC 208 may be configured to implement a primitive engine (not shown) for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture, unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

In one embodiment, each GPC 208 includes a number M of SPMs 310, where M≥1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups corresponds to what has been previously referred to herein as a "cooperative thread array" ("CIA"). The size of a particular CTA is equal to m*k, where k is the number of concurrently executing threads in a thread group and is typically an integer multiple of the number of parallel processing engines within the SPM 310, and m is the number of thread groups that are part of the CTA and simultaneously active within the SPM 310. The size of a CTA is generally determined by the programmer and the amount of hardware resources, such as memory or registers, available to the CTA.

Debugging Programs Executing on a PPU

Figure 4:
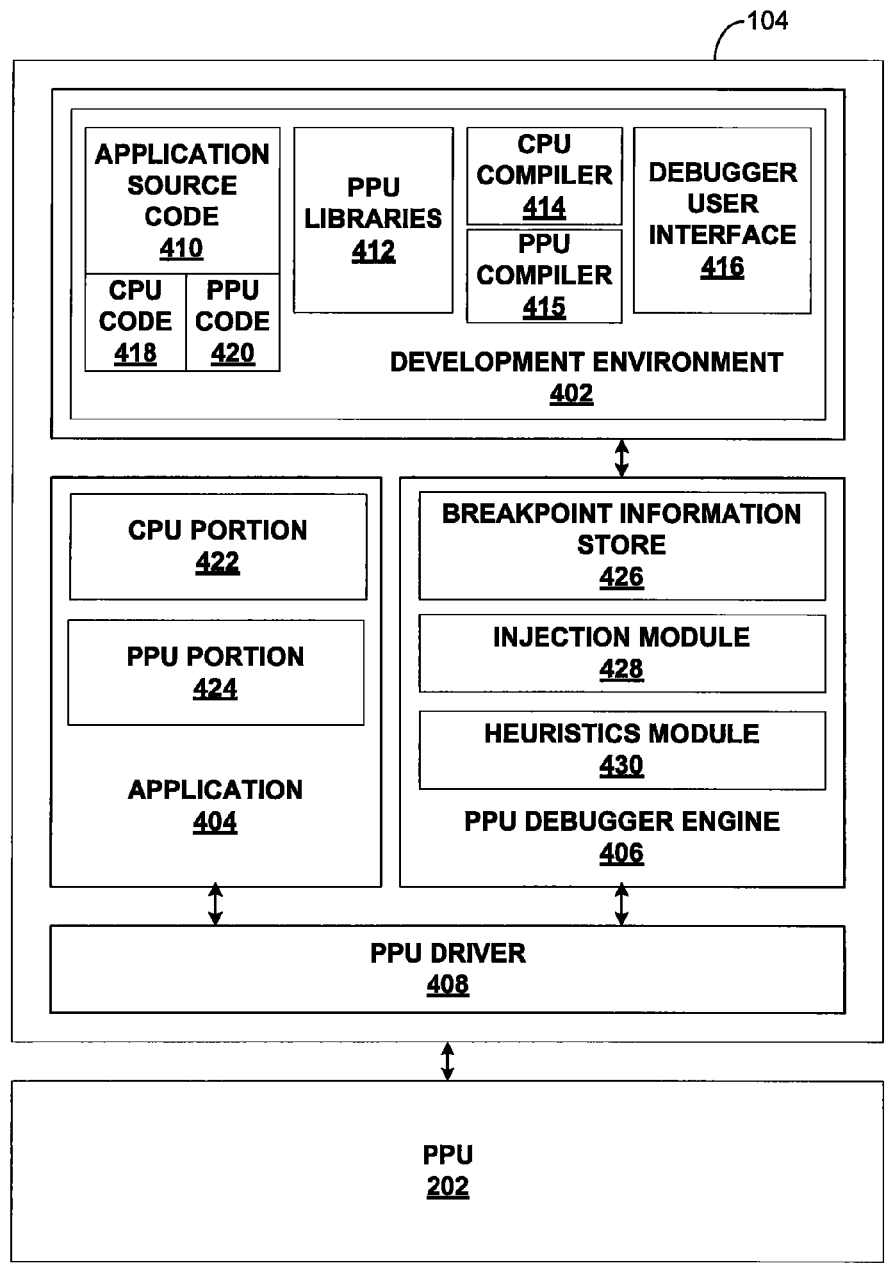
FIG. 4 is a more detailed diagram of the various software programs that may execute within the computer system of FIG. 1, according to one embodiment of the present invention.

FIG. 4 is a more detailed diagram of the various software programs that may execute within the computer system 100 of FIG. 1, according to one embodiment of the present invention. As shown, the system memory 104 includes a development environment 402, an application 404, a PPU debugger engine 406 and a PPU driver 408. Persons skilled in the art will recognize that while development environment 402 is shown in the same system memory 104 as the application 404 and PPU debugger engine 406 and PPU driver 408, the development environment 402 could be on a system memory within a different computer to facilitate remote debugging.

The development environment 402 is a set of programming tools used by a software developer to create and test a particular software program. The development environment 402 includes application source code 410, PPU library 412, a CPU compiler 414, a PPU compiler 415 and a debugger user interface 416. The application source code 410 defines a set of instructions written by the software developer in one or more programming languages, such as C, C++ or OpenCL, defining the particular software program. The set of instructions within the application source code 410 includes two groups of instructions, CPU code 418 and PPU code 420. Instructions included in the CPU code 418 are executed by the CPU 102, and instructions included in the PPU code 420 are executed by the PPU 202. Instructions in the PPU code 420 may invoke routines stored in the PPU library 412. The PPU library 412 is a collection of routines available to the software developer that, when invoked, perform computationally expensive operations on the PPU 202.

The CPU compiler 414 is a software program that transforms (i.e. compiles) the set of instructions defined in the CPU code 418 written in a particular programming language into byte code that may be executed by the CPU 102. Similarly, the PPU compiler 415 is a software program that transforms the set of instructions defined in the PPU code 420 into byte code that may be executed by the PPU 202. In one embodiment, the CPU compiler 414 and the PPU compiler 415 may be combined into a single compiler. In an alternative embodiment, the PPU compiler may be resident in the PPU driver 408.

The compilation of the application source code 410 results in the generation of application 404. The application 404 includes a CPU portion 422 that corresponds to the CPU code 418 in the application source code 410, and a PPU portion 424 that corresponds to the PPU code 420 in the application source code 410. Each instruction in the CPU code 418 corresponds to specific byte code in the CPU portion 422. Similarly, each instruction in the PPU code 420 corresponds to specific byte code in the PPU portion 424. In one embodiment, the byte code for a given instruction, whether for the CPU portion 422 or PPU, may be at more than a single location within the CPU code 422 or PPU code 424.

The debugger user interface 416 allows the software developer to set breakpoints on different instructions within the application source code 410. A breakpoint set on a particular instruction defines an interruption point in the execution of the application 404. The debugger user interface 416 also allows the software developer to set breakpoints on machine instructions within the application 404 that correspond to instructions in the application source code 410. Further, breakpoints may be set on certain events, e.g., when a specific region of memory is written, that are not directly related to specific instructions within the application source code 410. The debugger user interface 416 also allows the software developer to inspect the state of variables and execution patterns of the application 404 when the interruption point is reached in the execution of the application 404. In addition to allowing the inspection of the state of variables, the debugger user interface 416 also provides access to any region of memory and displays any retrievable state information associated with the CPU 102 and/or the PPU 202 from that region of memory.

When a breakpoint is set on a specific instruction within the PPU code 420, the debugger user interface 416 transmits a notification that includes breakpoint information associated with the breakpoint to the PPU debugger engine 406. The breakpoint information identifies the specific instruction within the application source code 410 on which the breakpoint is set. The breakpoint information may also include conditional statements that determine whether the execution of the PPU portion 424 on the PPU 202 of the application 404 should be interrupted when the specific instruction is executed. Further, the breakpoint information may include information regarding specific thread groups and specific variables that the software developer would like to inspect during the execution of the PPU portion 424.

In response to the notification received from the debugger user interface 416, the PPU debugger engine 406 stores the breakpoint information included in the notification is stored within the breakpoint information store 426. Based on the breakpoint information, an injection module 428 within the PPU debugger engine 406 then injects a debugging routine into the PPU portion 424. The debugging routine is injected in a location within the PPU portion 424 that corresponds to the specific instruction identified by the breakpoint information. The debugging routine includes any conditional statements that may be included in the breakpoint information received from the debugger user interface 416. The debugging routine also includes statements that cause the PPU 202 to interrupt the execution of the PPU portion 424 when the specific instruction is executed and any conditional statements are satisfied.

When the execution of the PPU portion 424 is interrupted because of the debugging routine, the PPU driver 408 notifies the PPU debugger engine 406 that the specific instruction of the PPU portion 424 has been executed. Upon receiving the notification from the PPU driver 408, the PPU debugger engine 406 determines a set of thread groups within the PPU 202 that should be inspected. The PPU debugger engine 406 first determines whether the breakpoint information associated with the breakpoint set on the specific instruction includes a set of thread groups that the software developer would like to inspect during the execution of the PPU portion 424. If the breakpoint information does not include such information, then a heuristics module 430 within the PPU debugger engine 406 determines the set of thread groups that should be inspected based on the debugging patterns associated with the software developer. Such patterns may include previous thread groups inspected by the software developer and recent changes made by the software developer to the PPU code 424.

Once the set of thread groups being inspected is determined by the PPU debugger engine 406, the PPU debugger engine 406 retrieves thread state information associated with each thread group in the set of thread groups being inspected from the PPU 202 via the PPU driver 408. Thread state information includes the execution state (i.e., complete, scheduled, inactive) of each thread in a thread group being inspected. Thread state information also includes the values of the variables included in the PPU code 420 at the point the execution of the PPU portion 424 is interrupted. Further, thread state information includes information regarding any memory accesses made by the thread up to when the execution is interrupted.

The PPU debugger engine 406 then transmits the thread state information associated with each thread group in the set of thread groups being inspected to the debugger user interface 416 for display to the software developer. The software developer can inspect the values of the variables or observe the overall execution pattern of the different thread groups in the set of thread groups being inspected based on the displayed thread state information. Once the software developer has analyzed the thread state information, the execution of the PPU portion 424 on the PPU 202 can be resumed.

Figure 5:
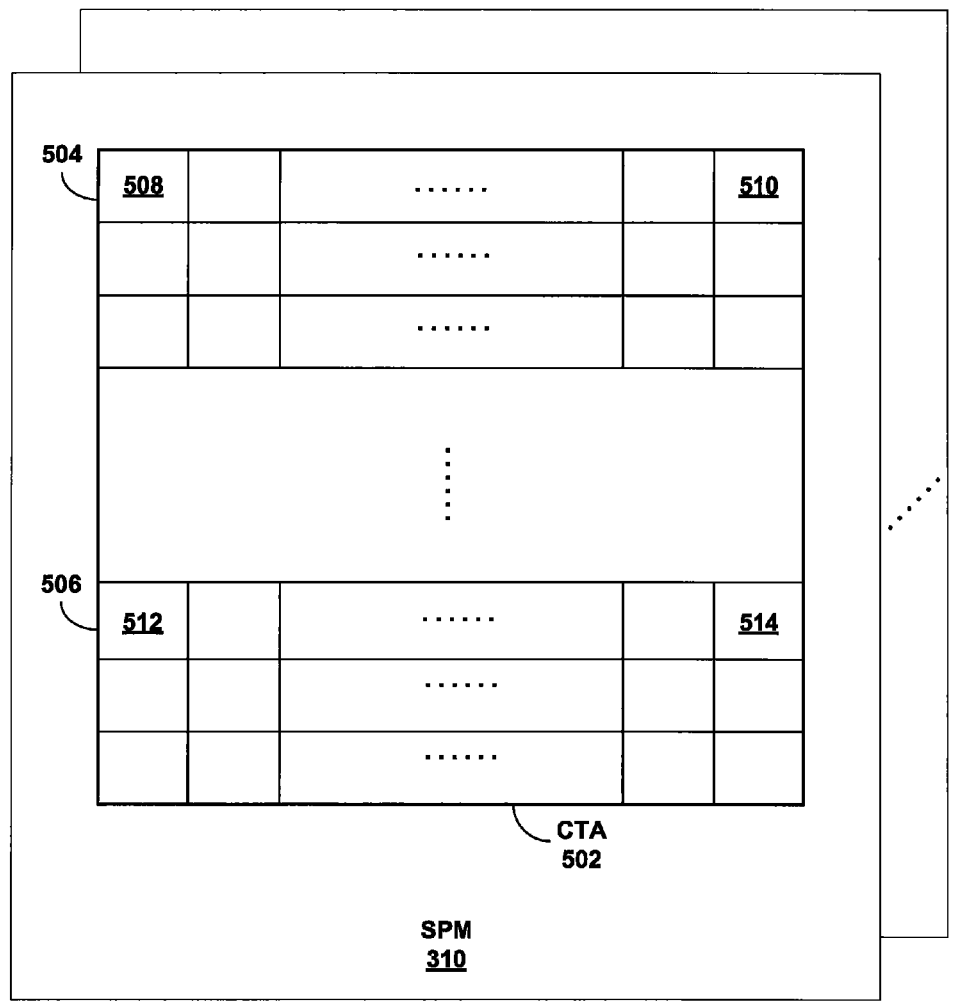
FIG. 5 is a conceptual diagram illustrating a CTA executing within the SPM of FIG. 3, according to one embodiment of the present invention.

FIG. 5 is a conceptual diagram illustrating a CTA 502 executing within the SPM 310 of FIG. 3, according to one embodiment of the present invention. As shown, the CTA 502 includes many thread groups executing the PPU portion 424 such as thread group 504 and thread group 506. As previously described, a thread group refers to a group of threads concurrently executing the same program on different input data, with each thread of the group being assigned to a different processing engine within the SPM 310. For example, threads 508 and 510 included in the thread group 504 may execute byte code corresponding to a specific instruction included in the PPU code 420 on different input data. Similarly, threads 512 and 514 may execute byte code corresponding to a different instruction included in the PPU code 420 on different input data. In this manner, the SPM 310 is configured to efficiently execute the PPU portion 424 in a parallel fashion.

Figure 6:
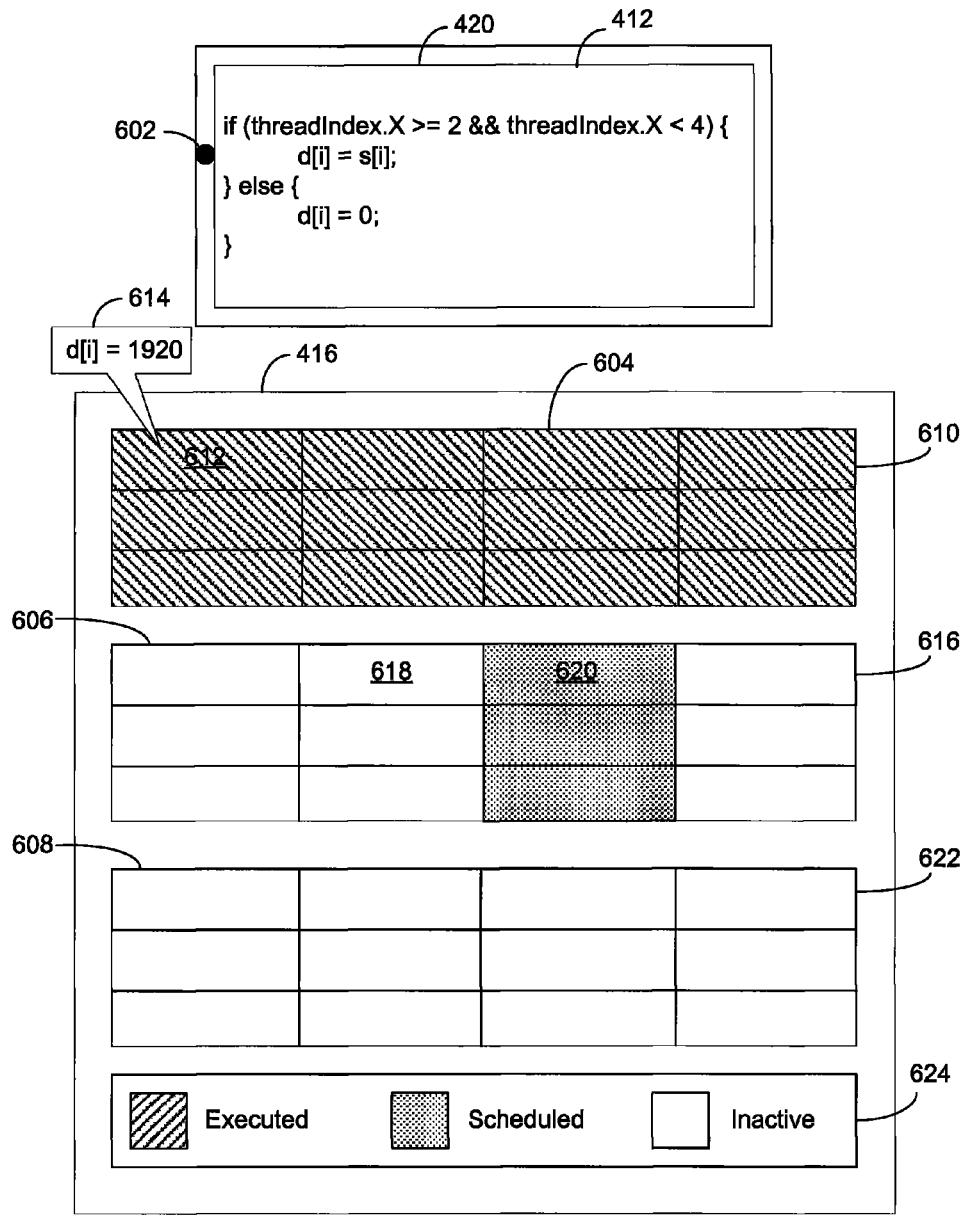
FIG. 6 is a conceptual diagram of a display on the debugger user interface of FIG. 4 when PPU code is being debugged, according to one embodiment of the present invention.

FIG. 6 is a conceptual diagram of a display on the debugger user interface 416 of FIG. 4 when PPU code 420 is being debugged, according to one embodiment of the present invention. As shown, the debugger user interface 416 includes three different CTA displays, CTA display 604, CTA display 606 and CTA display 608, and an indicator guide 624.

As previously described in FIG. 4, a software developer may set different breakpoints on instructions within the PPU code 420 to define interruption points in the execution of the PPU portion 424 on the PPU 202. Breakpoint 602 is one such breakpoint that is set on a specific instruction in the PPU code 420. When the byte code within the PPU portion 424 that corresponds to the specific instruction is executed by the PPU 202, the execution of the PPU portion 424 is interrupted. The PPU debugger engine 406 then retrieves the thread state information associated with each thread group in a set of thread groups being inspected from the PPU 202. Thread state information includes the execution state (i.e., complete, scheduled, inactive) of each thread in each thread group in the set of thread groups being inspected. Thread state information also includes the values of the variables within each thread in each thread group in the set of thread groups being inspected when the execution is interrupted. The PPU debugger engine 406 transmits the thread state information associated with each thread group in the set of thread groups being inspected to the debugger user interface 416 for display to the software developer.

The thread state information received from the PPU debugger engine 406 is displayed in CTA displays within the debugger user interface 416, such as the CTA display 604, the CTA display 606 and the CTA display 608. Each CTA display corresponds to a specific CTA within an SPM 310 that is executing the PPU portion 424 of the application 404. Further, each CTA display displays thread state information associated with one or more thread groups being inspected included within the corresponding CTA. Each row within a CTA display is associated with one thread group included in the corresponding CTA, and each box within a specific row is associated with one thread in the thread group.

Thread state information displayed in CTA displays is color coded to indicate the execution state of the different threads within the thread groups included in the corresponding CTA. The indicator guide 624 informs the software developer of the different thread states that the color codes indicate. As persons skilled in the art will recognize, thread state information can be displayed in any technically feasible manner. For example, different visual cues, such as glyphs and relative sizes, can be used to display the thread state information within the CTA displays. Further, thread state information may be displayed as raw data that can be analyzed by the software developer.

In one embodiment, CTA display 604 may correspond to CTA 502 and display thread state information associated with different thread groups within CTA 502. In such an embodiment, row 610 within the CTA display 604 may display thread state information associated with the thread group 504 within CTA 502. Also, each box in row 610 may be associated with a single thread in the thread group 504, for example box 612 is associated with thread 508. As indicated by the color of each box in row 610, all of the threads in thread group 504 have finished execution. Similarly, CTA display 606 and CTA display 608 include row 616 and row 622, respectively, that correspond to different thread groups within different CTAs in the SPMs 310. Row 616 includes box 618 and box 622 that are associated with different threads in a thread group corresponding to row 616. As shown, box 618 indicates that the associated thread is inactive and box 620 indicates that the associated thread is scheduled for execution.

Once the CTA displays are populated with thread state information, the software developer can analyze and inspect the thread state information. The software developer can inspect the value of different variables in one or more threads in the set of thread groups being inspected. For example, the software developer may inspect the value of the variable d[i] in the PPU code 420 within the thread 508 by clicking on box 612. The value of the variable d[i] is then displayed in a variable display 614. The software developer may also analyze the execution state of different threads within thread groups being inspected displayed on the CTA display 604, the CTA display 606, and the CTA display 608 to determine the execution pattern of the PPU portion 424 within the PPU 202. Such a determination assists the software developer in identifying inefficient execution patterns, such as many idle threads within different thread groups. The software developer may also inspect the displayed thread state information to determine memory accesses performed by different threads within the thread groups being inspected. Analyzing the memory access patterns allows the software developer to determine whether the instructions within the PPU code 420 efficiently access external memory.

In one embodiment, thread state information associated with a plurality of threads in a thread group is coalesced into a single display. For example, in such an embodiment, box 612 in row 610 is associated with a plurality of threads. This allows the software developer to view more thread state information per thread group.

Figure 7:
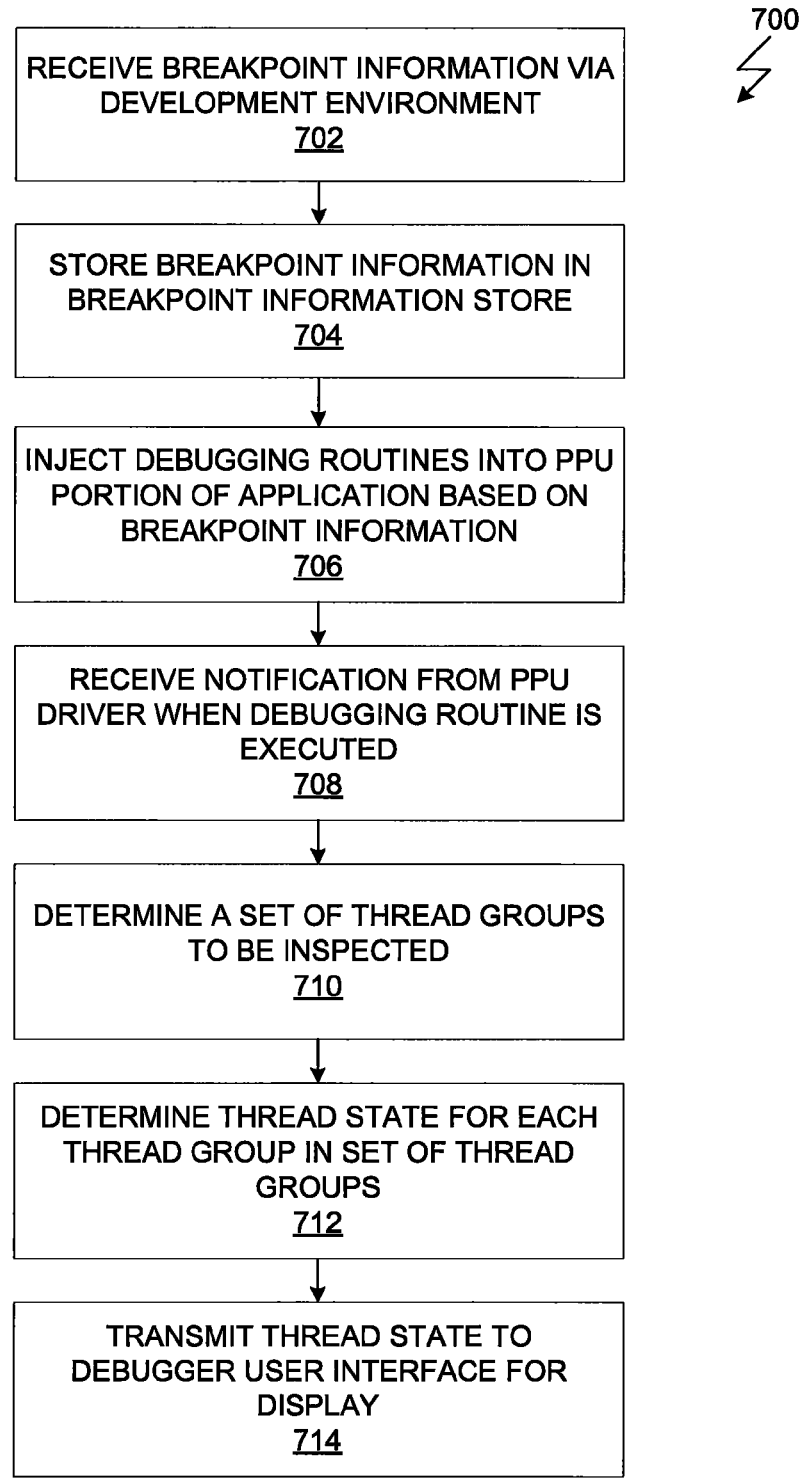
FIG. 7 is a flow diagram of method steps for debugging PPU code executing on the PPU, according to one embodiment of the present invention.

FIG. 7 is a flow diagram of method steps for debugging PPU code 420 executing on the PPU 202, according to one embodiment of the present invention. Although the method steps are described in conjunction with the systems for FIGS. 1-6, persons skilled in the art will understand that any system configured to perform the method steps, in any order, is within the scope of the invention.

The method 700 begins at step 702, where the PPU debugger engine 406 receives breakpoint information associated with the breakpoint 602, via the development environment 402. As previously described in conjunction with FIG. 4, the breakpoint information identifies the specific instruction within the application source code 410 on which the breakpoint 602 is set. The breakpoint information may include information regarding specific thread groups and specific variables that the software developer would like to inspect during the execution of the PPU portion 424.

At step 704, the PPU debugger engine 406 stores the breakpoint information in the breakpoint information store 426. At step 706, in response to receiving the breakpoint information, the PPU debugger engine 406 injects a debugging routine into the PPU portion 424 of the application 404. The debugging routine is injected into a location in the PPU portion 424 that corresponds to the specific instruction in the PPU code 420 associated with the breakpoint 602.

At step 708, in response to the specific instruction associated with the breakpoint 602 being executed, the PPU debugger engine 406 receives a notification from the PPU driver 408 indicating that the PPU 202 has interrupted the execution of the PPU portion 424. At step 710, the PPU debugger engine 406 determines a set of thread groups within the PPU 202 that should be inspected. In one embodiment, the breakpoint information may specify the set of thread groups that should be inspected. In a different embodiment, the heuristics module 430 in the PPU debugger engine 406 determines the set of thread groups that should be inspected based on the debugging patterns associated with the software developer.

At step 712, the PPU debugger engine 406 retrieves thread state information associated with each thread group in the set of thread groups being inspected from the PPU 202 via the PPU driver 408. Thread state information includes the execution state (i.e., complete, scheduled, inactive) of each thread in a thread group. Thread state information also includes the values of the variables included in the PPU code 420 at the point the execution of the PPU portion 424 is interrupted.

At step 714, the PPU debugger engine 406 transmits the thread state information associated with each thread group in the set of thread groups being inspected to the debugger user interface 416 for display to the software developer. Thread state information associated with a collection of thread groups belonging to the same CTA is displayed in a CTA display, such as CTA display 610. The software developer can inspect the values of the variables or observe the overall execution pattern of the different thread groups in the set of thread groups being inspected based on the displayed thread state information.

In sum, the PPU debugger engine receives breakpoint information associated with a breakpoint set on a specific instruction within PPU code. In response to the breakpoint information, the PPU debugger engine injects a debugging routine into the compiled PPU code that can be executed by the PPU. When the specific instruction is executed by the PPU, the execution of the PPU code is interrupted in response to the debugger routine. The PPU driver then notifies the PPU debugger engine that the execution of the PPU code has been interrupted indicating the specific instruction that was last executed.

In response, the PPU debugger engine determines a set of thread groups within the PPU that should be inspected. The set of thread groups that should be inspected is determined either by specific thread groups identified in the breakpoint information or by a heuristics module within the PPU debugger engine. Once this set of thread groups is determined, the PPU debugger engine retrieves thread state information associated with each thread group in the set of thread groups being inspected from the PPU via the PPU driver. Thread state information includes the execution state of each thread in each thread group and values of variables included in the PPU code. The thread state information is then transmitted by the PPU debugger engine to the debugger user interface for display to the software developer.

One advantage of the disclosed technique is that by analyzing thread state information associated with different thread groups executing the PPU code, the software developer gains better understanding of the execution pattern of the PPU code within the PPU. The execution pattern indicates how efficiently CTAS are being used by the PPU code, and how the different threads within the thread groups are accessing memory. Such an understanding allows the software developer to write efficient PPU code.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A computer-implemented method for debugging a software program executing on a parallel processor, the method comprising:

receiving breakpoint information from a development environment, wherein the breakpoint information is associated with a breakpoint set on a first instruction of one or more instructions included within a parallel processor unit (PPU) portion of the software program, wherein the software program includes both the PPU portion and a central processor unit (CPU) portion;

injecting a debugging routine into the PPU portion of the software program based on the breakpoint information, wherein the debugging routine causes the parallel processor to interrupt the execution of the PPU portion of the software program when the first instruction is executed by a first thread in a first thread group executing within the parallel processor, and wherein each thread within the first thread group executes the one or more instructions on the different input data;

receiving a notification from a driver indicating that the first instruction has been executed by the first thread in the first thread group and that the execution of the PPU portion of the software program has been interrupted;

retrieving thread state information associated with the first thread group; and transmitting the thread state information associated with the first thread group to a user interface for display on a display device.

2. The method of claim 1, further comprising the step of storing the breakpoint information in a breakpoint information store located within system memory.

3. The method of claim 2, further comprising the step of identifying the first thread group for inspection on thread group information configured by a software developer and included in the breakpoint information.

4. The method of claim 1, wherein the breakpoint information does not identify the first thread group for inspection, and further comprising determining a plurality of thread groups for inspection based on one or more debugging patterns associated with a software developer.

5. The method of claim 1, wherein the thread state information includes an execution status for each thread included in the first thread group.

6. The method of claim 1, wherein the thread state information includes memory access patterns for each thread included in the first thread group.

7. The method of claim 1, wherein the thread state information includes, for each thread included in the first thread group, values of one or more variables defined by the software program.

8. The method of claim 5, wherein the thread state information associated with two or more threads included in the first thread group is combined and the user interface displays coalesced thread state information.

9. The method of claim 5, wherein the execution status of each thread in the first thread group indicates whether the thread has completed execution of the first instruction, is scheduled to execute the first instruction, or is inactive.

10. A computer-readable storage medium storing instructions that, when executed by a processor, cause the processor to debug a software program executing on a parallel processor, by performing the steps of:

receiving breakpoint information from a development environment, wherein the breakpoint information is associated with a breakpoint set on a first instruction of one or more instructions within a parallel processor unit (PPU) portion of the software program, wherein the software program includes a central processor unit (CPU) portion and the PPU portion;

injecting a debugging routine into the PPU portion of the software program based on the breakpoint information, wherein the debugging routine causes the parallel processor to interrupt the execution of the PPU portion of the software program when the first instruction is executed by a first thread in a first thread group of a set of thread groups executing within the parallel processor, and wherein each thread within the first thread group executes the one or more instructions on the different input data;

receiving a notification from a driver indicating that the first instruction has been executed by the first thread in the first thread group and that the execution of the PPU portion of the software program has been interrupted;

retrieving thread state information associated with the first thread group; and transmitting the thread state information associated with the first thread group to a user interface for display on a display device.

11. The computer-readable storage medium of claim 10, further comprising the step of storing the breakpoint information in a breakpoint information store located within system memory.

12. The computer-readable storage medium of claim 11, further comprising the step of identifying the first thread group for inspection on thread group information configured by a software developer and included in the breakpoint information.

13. The computer-readable storage medium of claim 10, wherein the breakpoint information does not identify the first thread group for inspection, and further comprising determining a plurality of thread groups for inspection based on one or more debugging patterns associated with a software developer.

14. The computer-readable storage medium of claim 10, wherein the thread state information includes an execution status for each thread included in the first thread group.

15. The computer-readable storage medium of claim 10, wherein the thread state information includes memory access patterns for each thread included in the first thread group.

16. The computer-readable storage medium of claim 10, wherein the thread state information includes, for each thread included in the first thread group, values of one or more variables defined by the software program.

17. The computer-readable storage medium of claim 10, wherein the thread state information associated with two or more threads included in the first thread group is combined and the user interface displays coalesced thread state information.

18. A computer system, comprising:

a processor; and a memory unit coupled to the processor and including instructions that, when executed by the processor, cause the processor to debug a software program executing on a parallel processor, by performing the steps of:

receiving breakpoint information from a development environment, wherein the breakpoint information is associated with a breakpoint set on a first instruction of one or more instructions within a parallel processor unit (PPU) portion of the software program, wherein the software program includes a central processor unit (CPU) portion and the PPU portion;

injecting a debugging routine into the PPU portion of the software program based on the breakpoint information, wherein the debugging routine causes the parallel processor to interrupt the execution of the PPU portion of the software program when the first instruction is executed by a first thread in a first thread group of a set of thread groups executing within the parallel processor, and wherein each thread within the first thread group executes the one or more instructions on the different input data;

receiving a notification from a driver indicating that the first instruction has been executed by the first thread in the first thread group and that the execution of the PPU portion of the software program has been interrupted;

retrieving thread state information associated with the first thread group; and transmitting the thread state information associated with the first thread group to a user interface for display on a display device.

19. The method of claim 1, wherein the breakpoint information is related to a breakpoint set by a memory access operation generated by the PPU portion of the software, and the memory access operation involves a memory region that is not associated with any instructions included in the PPU portion of the software program.

20. The method of claim 1, wherein the breakpoint information is related to a breakpoint set on a machine instruction included in a plurality of machine instructions comprising at least a portion of the PPU portion of the software program.

* * * * *